United States Patent

Gasloli

Patent Number: 5,179,468
Date of Patent: Jan. 12, 1993

[54] INTERLEAVING OF SIMILAR THIN-FILM STACKS FOR PRODUCING OPTICAL INTERFERENCE COATINGS

[75] Inventor: Paul J. Gasloli, Watertown, Mass.

[73] Assignee: GTE Products Corporation, Danvers, Mass.

[21] Appl. No.: 787,855

[22] Filed: Nov. 5, 1991

[51] Int. Cl.[5] ............................. G02B 5/28; F21V 9/04
[52] U.S. Cl. .................................. 359/359; 359/588; 359/589
[58] Field of Search ............... 359/359, 360, 350, 588, 359/589

[56] References Cited

U.S. PATENT DOCUMENTS

| | | | |
|---|---|---|---|
| 3,614,188 | 10/1971 | Seeley et al. | 359/359 |
| 3,853,386 | 12/1974 | Ritter et al. | 359/359 X |
| 4,854,670 | 8/1989 | Mellor | 359/359 |
| 4,931,315 | 6/1990 | Mellor | 359/359 X |

FOREIGN PATENT DOCUMENTS

0409554A2  7/1990  European Pat. Off.
2103830A   7/1989  United Kingdom

OTHER PUBLICATIONS

L. I. Epstein, "The Design of Optical Filters" *Journal of the Optical Society of America*, vol. 42, No. 11, pp. 806-810, Nov. 1952.
H. A. Macleod *Thin Film Optical Filters*, Macmillan Publishing Company, New York, 1986, pp. 191-198.

Primary Examiner—Bruce Y. Arnold
Assistant Examiner—David R. Parsons
Attorney, Agent, or Firm—Frances P. Craig

[57] ABSTRACT

The present invention describes an optical interference coating useful for transmitting visible radiation and reflecting infrared radiation. The coating is formed from a series of interleaved stacks. The interleaved stacks require only two materials, one having a low index of refraction (L) and the second having a high index of refraction (H). The interleaved stack is made from a first stack of the form (L/a bH L/a) and a second stack of the form (H/a bL H/a). The interleaved stack includes one or more of the combined first stack and second stack in the form [(L/a bH L/a) (H/a bL H/a)]. A stack of the form (L/a bH L/a) is placed on one side of the interleaved stacks to achieve symmetry. The complete visible transmitting and infrared reflecting coating is made from two interleaved stack centered at different wavelength and a third quarterwave stack of the form (L/2 H L/2) centered at a third wavelength. Each interleaved stack and quarterwave stack includes one or more layers.

6 Claims, 10 Drawing Sheets

INTERLEAVING OF SIMILAR THIN-FILM STACKS FOR PRODUCING OPTICAL INTERFERENCE COATINGS

BACKGROUND OF THE INVENTION

The present invention describes a novel procedure for designing thin film filters using the technique of interleaving similar stacks. The resultant interleaved stacks can be used to make filters with extended ripple free passbands and reflectors with steep slopes.

This novel technique was developed because of the need to make IR reflective coatings with wide passbands in the visible portion of the spectrum. Two prior techniques for achieving this performance are the "2:1 stack" and stacks that require three materials with different indices of refraction typically designated as H = > high, L = > low and M = > medium.

The 2:1 stacks are two material stacks with layers alternating between the H (high) and L (low) indices of refraction and having optical phase thicknesses such that either the H or L material is twice the optical phase thickness of the other. The disadvantage of this stack is that the visible passband is set by this stack and is narrow compared to the three material stacks or the interleaving technique to be described.

The three material stacks have passbands that are wide and whose edges are not defined by one stack. The passband is typically described by two stacks centered at somewhat different wavelengths. One stack is of the three material type and centered at the longer wavelength. The other stack is typically a standard quarter-wave stack (i.e. alternating H and L layers with quarter-wave optical phase thicknesses) and centered at the shorter wavelength. The disadvantage of these stacks is, three materials with the appropriate indices of refraction must be used or one of the three indices must be synthesized from the other two.

The novel technique of interleaving similar thin-film stacks eliminates the need to utilize stacks comprising three materials. The interleaving technique also achieves bandwidths in the passband similar to the three material technique.

SUMMARY OF THE INVENTION

The present invention describes an interference coating for reflecting infrared radiation and transmitting visible light. The coating is formed from one or more interleaved stacks and a third standard quarter wave stack. An interleaved stack is made from two similar stacks. The first stack is made of three layers of the form (L/a bH L/a). The second stack is made of three layers of the form (H/a bL H/a). The interleaved stack is a plurality of a combined first and second stack and is of the form [(L/a bH L/a) (H/a bL H/a)]. L and H refer to materials of low and high indices of refraction respectively a and b refer to the thickness of each layer.

For a better understanding of the present invention, together with other and further advantages thereof, reference is made to the following description and appended claims in connection with the above-described drawing.

DETAILED DESCRIPTION OF THE PREFERRED EMBODIMENTS

The novel technique of interleaving similar thin-film stacks begins with the work of LI Epstien and his description of Herpin equivalent layers. A Herpin equivalent stack in its simplest form can be described with the notation (pqp). Where p and q are typically two materials of H-high and L-low indices of refraction. The arrangement of the H and L materials are such that the outer layers, the layers designated by p, have the same index of refraction and the same optical and physical thicknesses. This arrangement makes it simple to calculate what is known as the effective index and optical phase thickness at a particular wavelength. The interleaving technique uses this information to predict the regions of high reflectivity and high transmission.

A standard thin film filter is typically made by depositing multiple Herpin equivalent stacks. The notation for this type of stack arrangement is $(pqp)^n$. Where n is the number of times the stack is repeated. Using this notation and calculating the effective indices and phase thicknesses it is found that whenever the effective index is much greater than or less than 1.00, if the incident medium is air, and the effective phase thickness of the basic period (pqp) is an odd multiple of a half-wave, (i.e. $(2j-1)\pi$, $j = 1, 2, 3, \ldots$) there will be a region of high reflectance. Also, if two stacks are considered, one of the form (pqp) where p correspond to H (high index of refraction), and q corresponds to L (low index of refraction) $(H/a_1 \, b_1L \, H/a_1)$, and the other where p corresponds to L and q corresponds to H, $(L/a_2 \, b_2H \, L/a_2)$, and if $a_1 = a_2$ and $b_1 = b_2$, the two stacks will have similar spectral performance.

Figure 1:
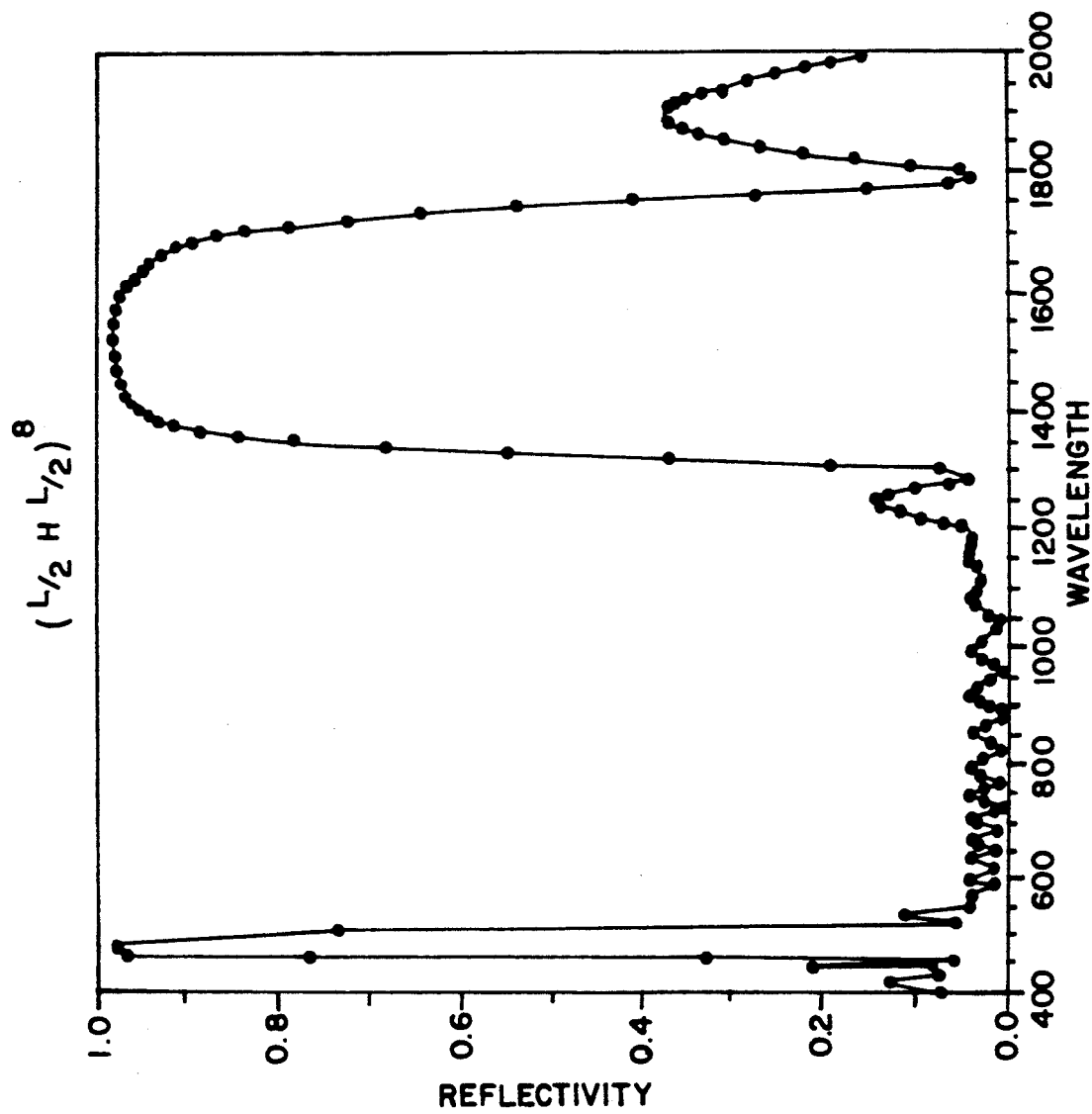
FIG. 1 shows reflectivity versus wavelength for a stack of the form $[L/2 \, H \, L/2]^8$.
Figure 2:
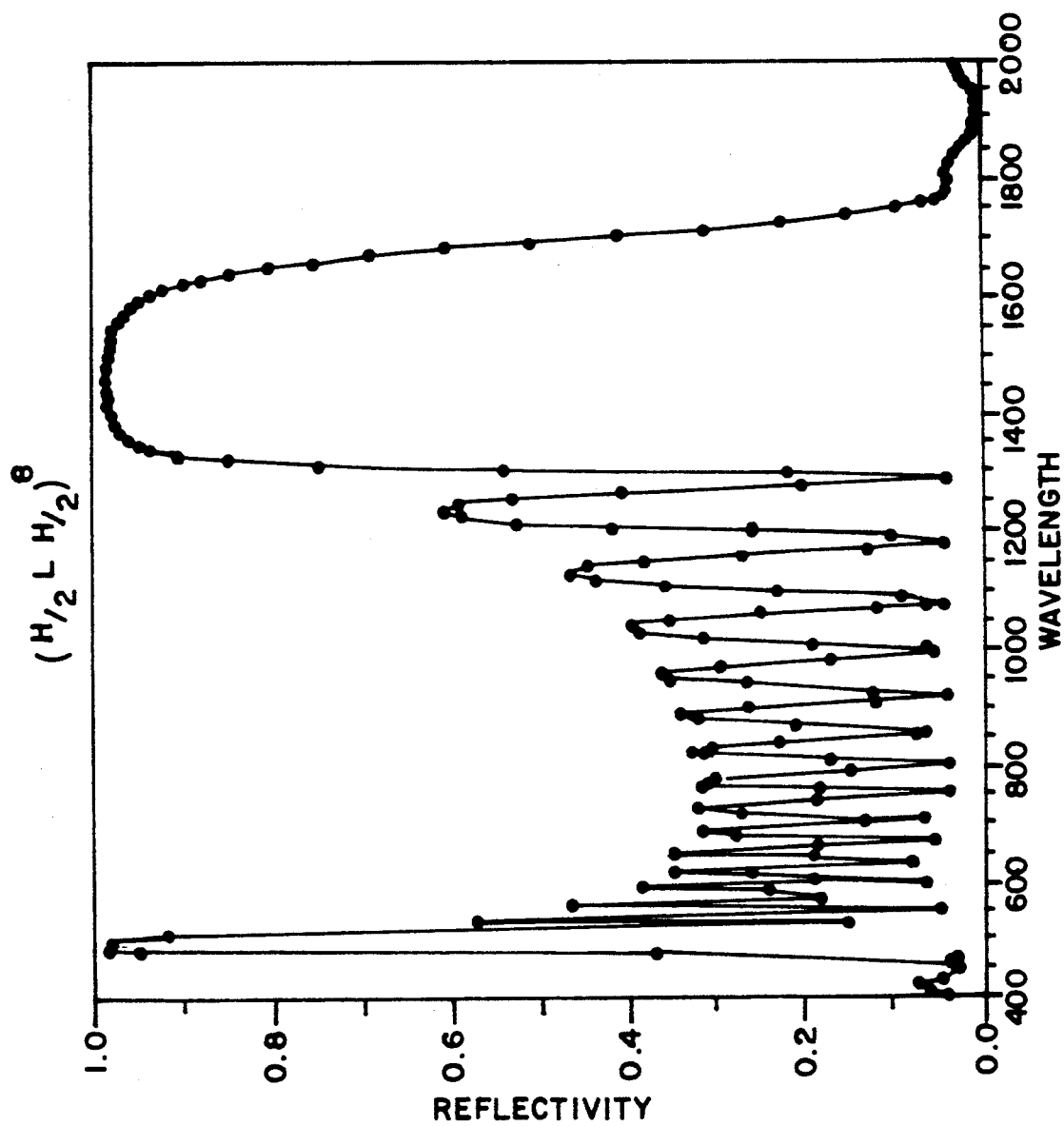
FIG. 2 shows reflectivity versus wavelength for a stack of the form $[H/2 \, L \, H/2]^8$.

For example, the two stacks (L/2 H L/2) and (H/2 L H/2) are both of the form (pqp). The only difference is that the H and L have been swapped. Spectrally their performance is similar. The location of the high reflection and transmission regions are the same. The only difference is the amplitude of the ripple in the transmission regions. This is shown graphically in FIGS. 1 and 2. FIG. 1 shows a stack of the form (L/2 H L/2)$^8$ and FIG. 2 shows a stack of the form (H/2 L H/2)$^8$. In FIGS. 1 and 2, the value for L was 1.44 and the value for H was 2.0.

Using the interleaving technique, the stack described above would be ((L/2 H L/2) (H/2 L H/2))$^n$ and will be referred to as the basic stack when n=1. To achieve symmetry an (L/2 H L/2) will be added to the complete interleaved stack. This interleaved arrangement will yield a high reflection region whenever two properties are satisfied. The first property requires that the basic stack's total equivalent phase thickness is an odd multiple of half wave thickness (i.e. $(2j-1)\pi$, j=1,2,3, ... ). The second property requires that the ratio of the Herpin equivalent indices of the two (pqp) stacks of the basic stack be greater or less than one. The further the ratio is from unity the higher the reflection.

The second property is the one that contributes to extending the high transmission regions and increasing the slopes at the edges of the high reflection regions. For the basic stack ((L/2 H L/2) (H/2 L H/2))$^n$ designed with a center wavelength at 1500 nm the high reflection regions will occur at wavelengths 3000 nm, 1000 nm, 600 nm, 428 nm, 333 nm, 272, 230 and 200 nm with minor peaks at 3000 nm, 428 nm, 333 nm and 200 nm. All the major peaks have effective indice ratios of 2.983/1.062 or 2.81 and all minor peaks have effective indice ratios of 1.623/1.952 or 0.831.

This is arrived at by calculating the ratio of the effective index of refraction for each Herpin equivalent layer in the interleaved stack. Shown in Table 1 are the effective index and effective phase thickness at selected wavelength for a Herpin equivalent stack of the form (L/2 H L/2) wherein H=2.2 and L=1.44. Table 2 shows similar data for a Herpin equivalent stack of the form (H/2 L H/2).

TABLE 1

| | Herpin equivalent (L/2 H L/2) | |
|---|---|---|
| Wavelength | Effective Index | Effective Phase Thickness |
| 3000 | 1.952 | 92.61 |
| 1000 | 1.062 | 262.39 |
| 600 | 1.062 | 452.61 |
| 429 | 1.952 | 627.39 |
| 333 | 1.952 | 812.61 |
| 273 | 1.062 | 987.39 |
| 231 | 1.062 | 1172.61 |
| 200 | 1.952 | 1347.39 |

H = 2.2
L = 1.44

TABLE 2

| | Herpin equivalent (H/2 L H/2) | |
|---|---|---|
| Wavelength | Effective Index | Effective Phase Thickness |
| 3000 | 1.623 | 92.61 |
| 1000 | 2.983 | 267.39 |
| 600 | 2.983 | 452.61 |
| 429 | 1.623 | 627.39 |
| 333 | 1.623 | 812.61 |
| 273 | 2.983 | 987.39 |
| 231 | 2.983 | 1172.61 |
| 200 | 1.623 | 1347.39 |

H = 2.2
L = 1.44

Figure 3:
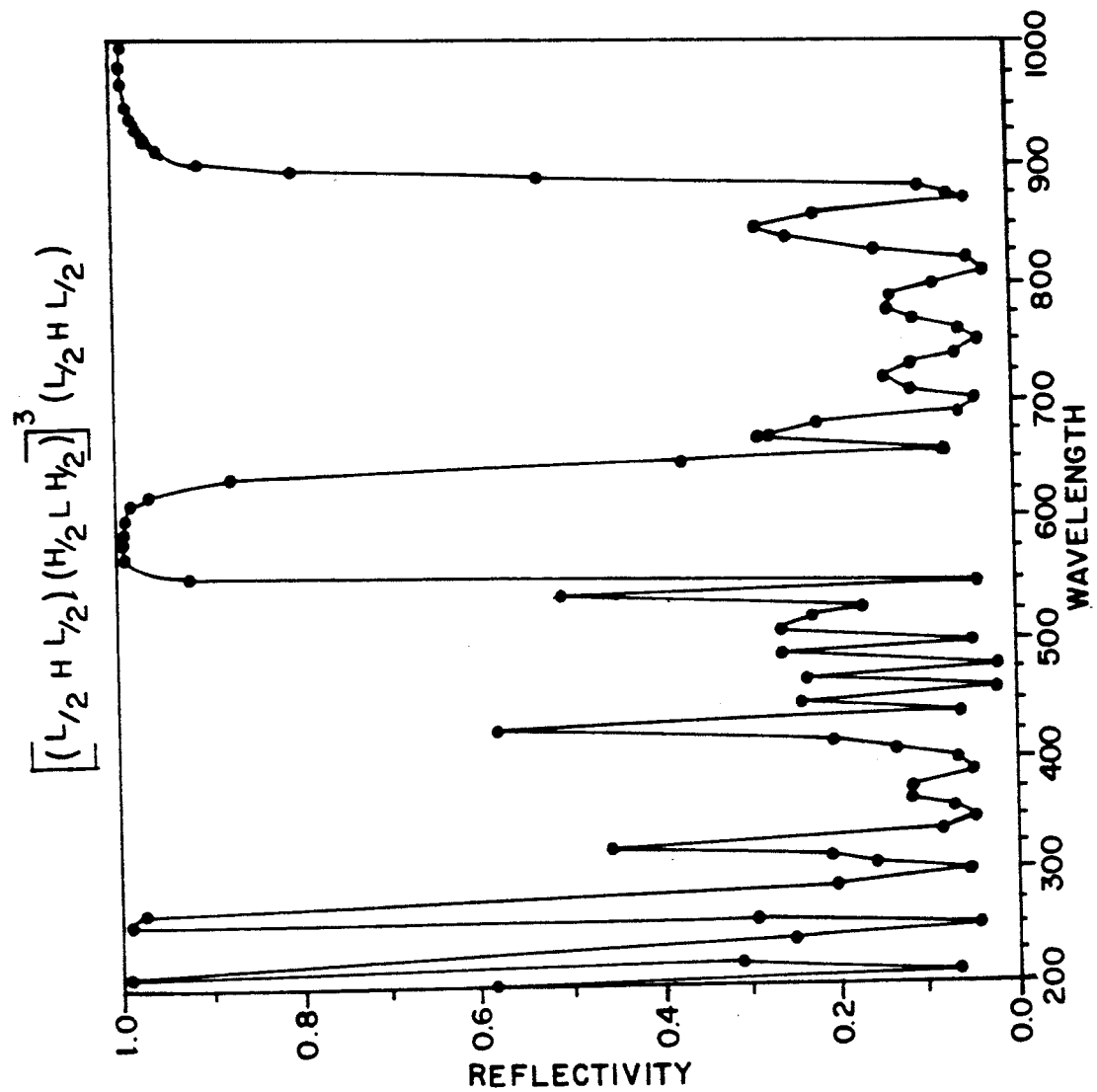
FIG. 3 shows reflectivity versus wavelength for an interleaved stack of the form $(L/2 \, H \, L/2 \, H/2 \, L \, H/2)^3$ (L/2 H L/2) from 200 to 1000 nm.
Figure 4:
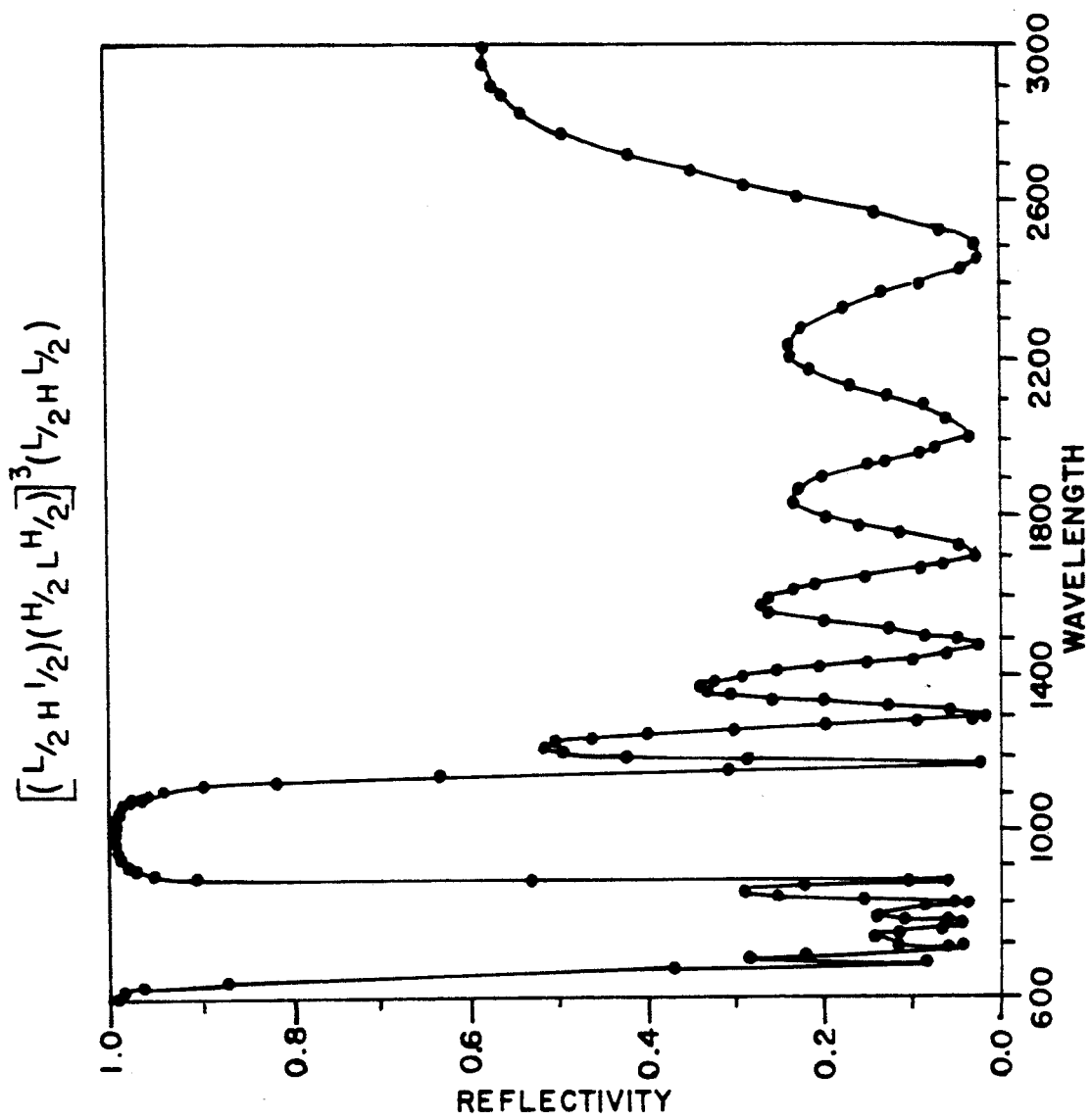
FIG. 4 shows reflectivity versus wavelength for a interleaved stack of the form $(L/2 \, H \, L/2 \, H/2 \, L \, H/2)^3$ (L/2 H L/2) from 600 to 3000 nm.

Shown in FIGS. 3 and 4 are graphs of the wavelength versus reflectance for an interleaved stack made from the Herpin equivalents shown in Tables 1 and 2. As can be seen the interleaving technique allows the suppression of reflection peaks whenever property one is satisfied and property two has a ratio that approaches unity.

Figure 9:
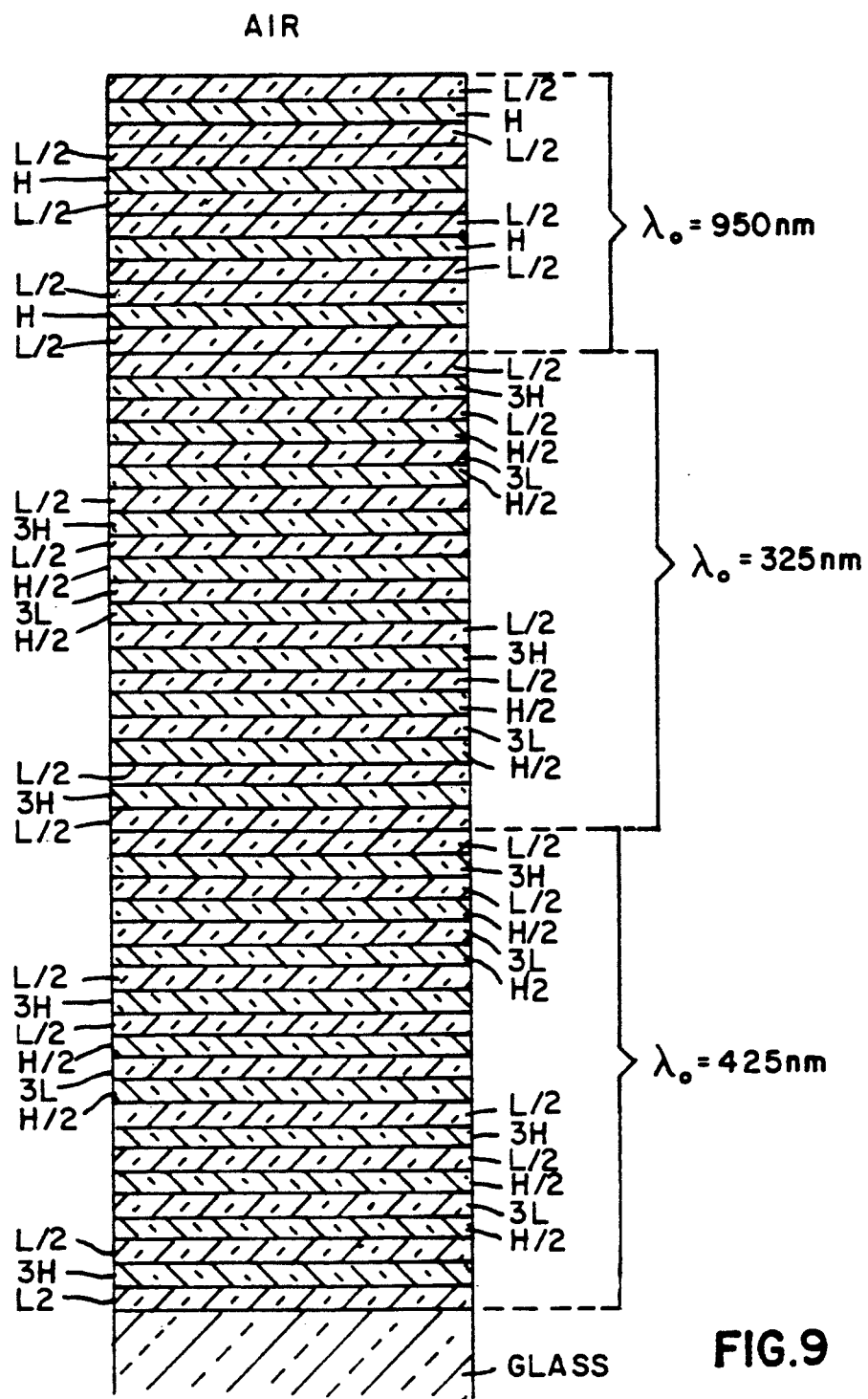
FIG. 9 is a schematic cross sectional view, not to scale, of an original interference coating for reflecting infrared radation in accordance with one embodiment of the invention.

To achieve the bandwidths necessary for an IR reflective coating with a high transmission region from 400 nm to 770 nm and a high reflection region from 800 nm to 1800 nm the thickness of the q layer in the (pqp) stack needs to be increased. Through trial and error experiments it is found that if the basic stack has the form ((L/2 3H L/2) (H/2 3L H/2))$^n$ and the center wavelength of the stack is 425 nm a major peak will occur near 1700 nm and 340 nm with a minor peak near 566 nm. Since the ratio of the effective indices at the minor peak is approximately 0.91 this peak is effectively suppressed. Therefore, the interleaving technique has achieved a bandwidth for the high transmission region greater than 1000 nm. If two interleaved stacks of this form are used along with a standard Herpin stack an IR reflective stack with the performance described above can be achieved. The complete stack configuration, also shown in FIG. 9, is:

| AIR | |
|---|---|
| (L/2 H L/2)$^4$ | $\lambda_o$ = 950 nm |
| ((L/2 3H L/2) (H/2 3L H/2))$^3$ (L/2 3H L/2) | $\lambda_o$ = 325 nm |
| ((L/2 3H L/2) (H/2 3L H/2))$^3$ (L/2 3H L/2) | $\lambda_o$ = 425 nm |
| GLASS | |

Figure 10:
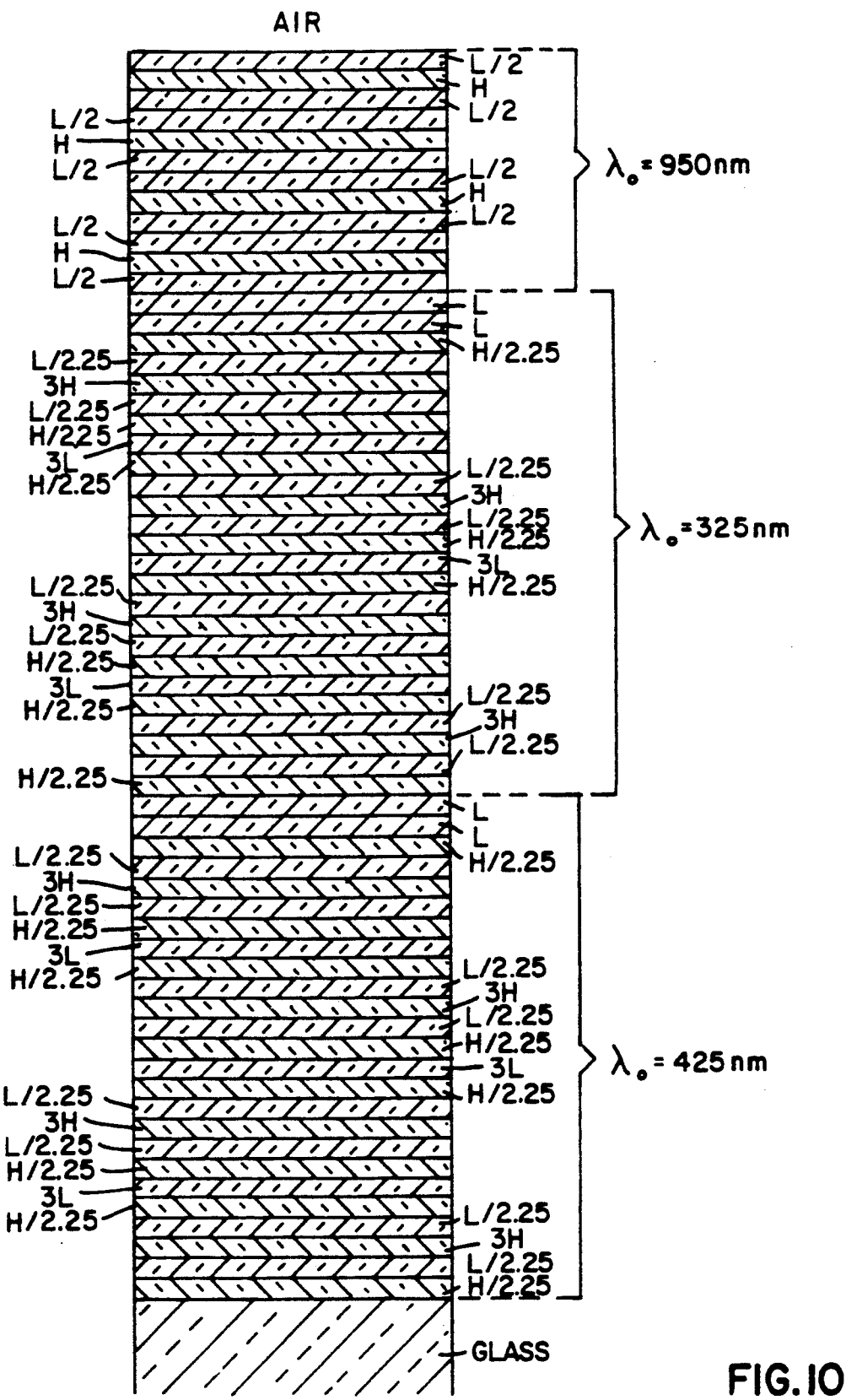
FIG. 10 is a schematic cross sectional view, not to scale, of an optical interference coating for reflecting infrared radiation in accordance with another embodiment of the invention.

This stack has some ripple in the passband that needs to be suppressed. This is done in two ways. First matching layers are placed on either side of the interleaved stacks. Matching layers are of the form LL H/2.25 and H/2.25 and are shown in the arrangement below. The matching layers shown are not in parenthesis. Second the minor peak associated with the interleaved stacks is further suppressed by simply making the eighth wave layers, those designated by L/2 and H/2, slightly thinner. The final stack arrangement, also shown in FIG. 10, is:

| AIR | |
|---|---|
| (L/2 H L/2)$^4$ | $\lambda_o$ = 950 nm |
| LL H/2.25 ((L/2.25 3H L/2.25) (H/2.25 3L H/2.25))$^3$ (L/2.25 3H L/2.25) H/2.25 | $\lambda_o$ = 325 nm |
| LL H/2.25 ((L/2.25 3H L/2.25) (H/2.25 3L H/2.25))$^3$ (L/2.25 3H L/2.25) H/2.25 | $\lambda_o$ = 425 nm |
| GLASS | |

Figure 5:
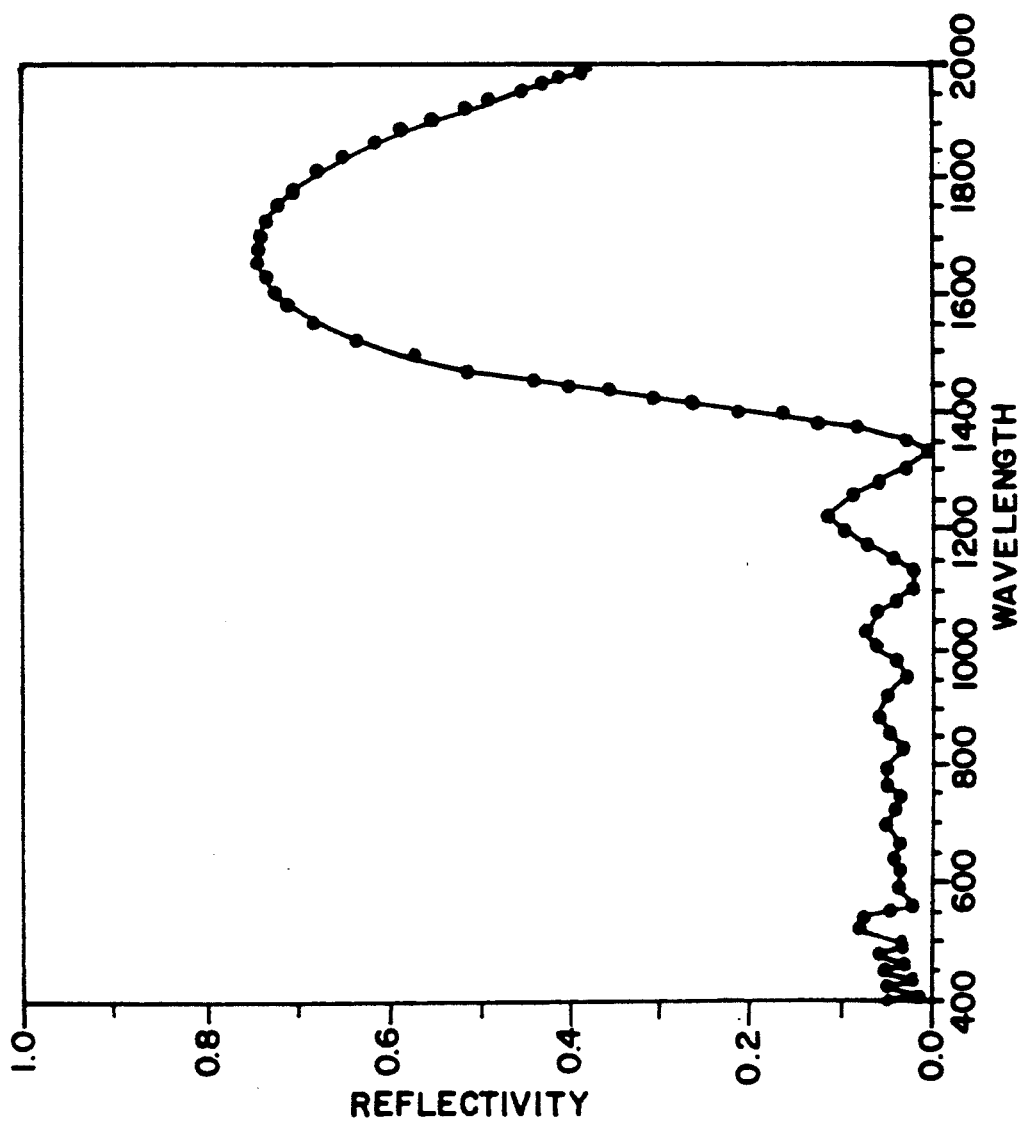
FIG. 5 shows predicted reflectivity versus wavelength for an interleaved stack designed for a center wavelength of 425 nm.
Figure 6:
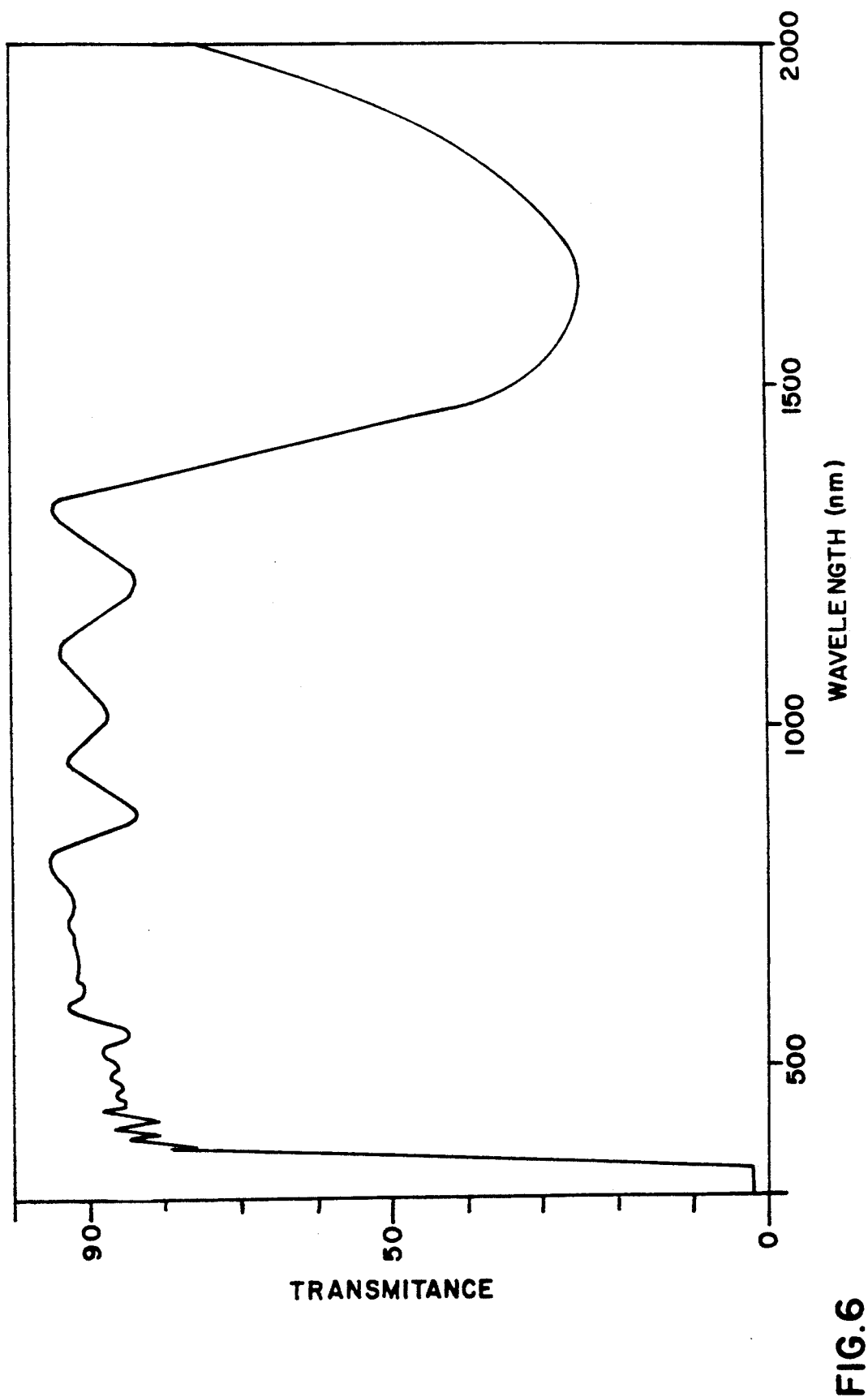
FIG. 6 shows actual transmission versus wavelength for the interleaved stack used in FIG. 5.

In order to test the technique of interleaving similar stacks, an interleaved stack of the form H/2.25 [(L/2.25 3H L/2.25) (H/2.25 3L H/2.25)]$^3$ (L/2.25 3H L/2.25) H/2.25 was manufactured and the results were compared with the predicted results. Each stack of the form (L/2.25 3H L/2.25) or (H/2.25 3L H/2.25) was designed for a center wavelength of 425 nm. The low index of refraction material had a value of 1.44 and the high index of refraction material had a value of 2.0. FIG. 5 shows the predicted performance of reflectivity versus wavelength while FIG. 6 shows the measured performance of transmission versus wavelength. As can be seen the predicted and measured results are in close agreement thus, proving that the interleaving of similar stacks is practical for producing IR reflective coatings.

The indices of the materials used to manufacture this coating should be about 1.40-1.50 for the low index material and 2.0-2.2 for the high index material. Silicon dioxide would be the logical choice for the low index material and a material such as titanium oxide, tantalum oxide, or zirconium oxide for the high index material. It is not the absolute value of the index of refraction of the high or low material but the ratio between the high index material and the low index material.

Figure 7:
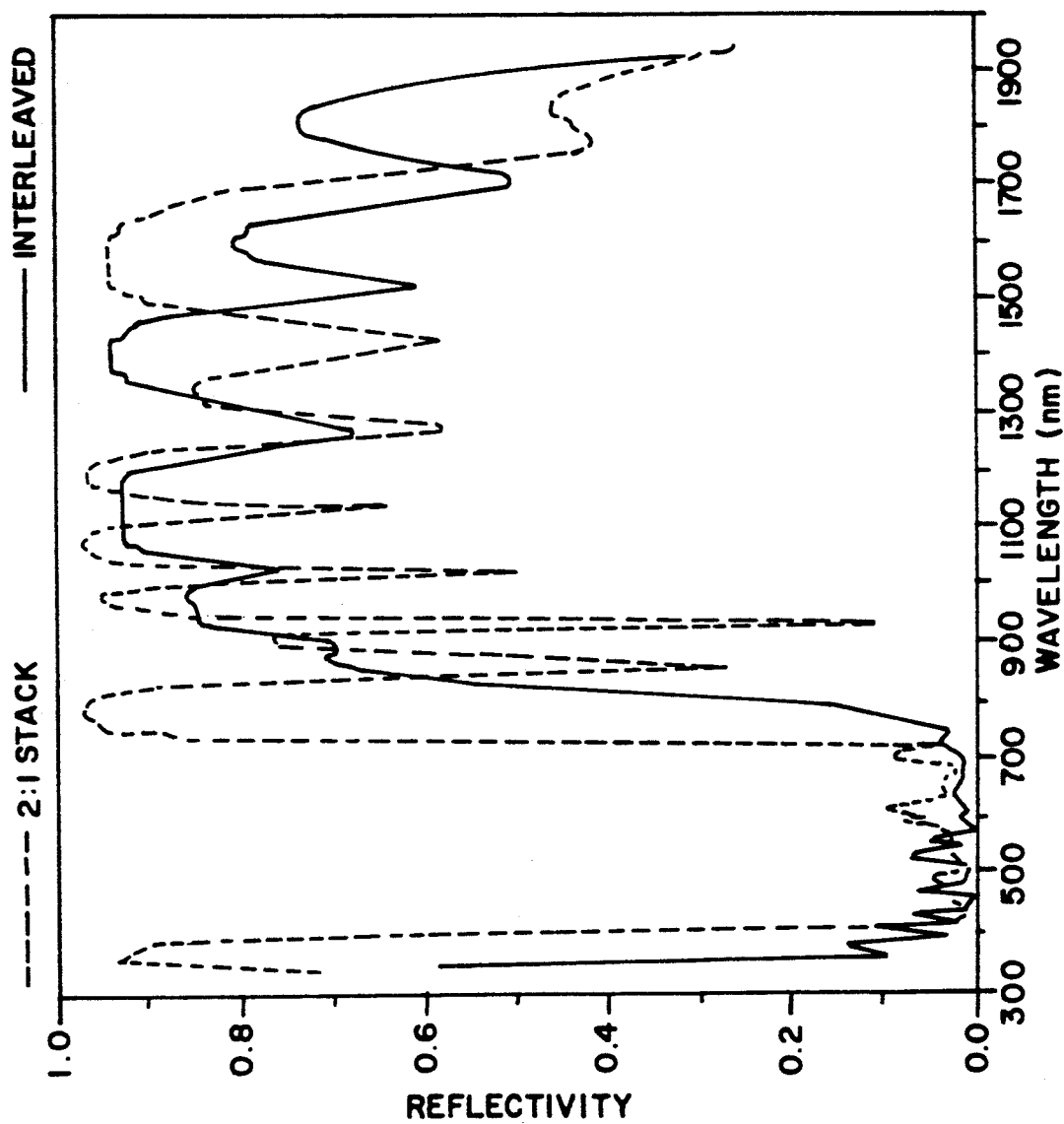
FIG. 7 shows a comparison of the reflectance of an IR reflector designed around interleaved stacks of the present invention with an IR reflector designed around a 2:1 type stack.

FIG. 7 shows a comparison of the reflectance of interleaved stacks of the present invention with prior art stacks (2:1) published in UK Patent Application 2103830A. FIG. 7 shows that the interleaved stacks allows transmittance of light over a greater wavelength window (≈400 nm to 800 nm) than in the 2:1 stack.

Figure 8:
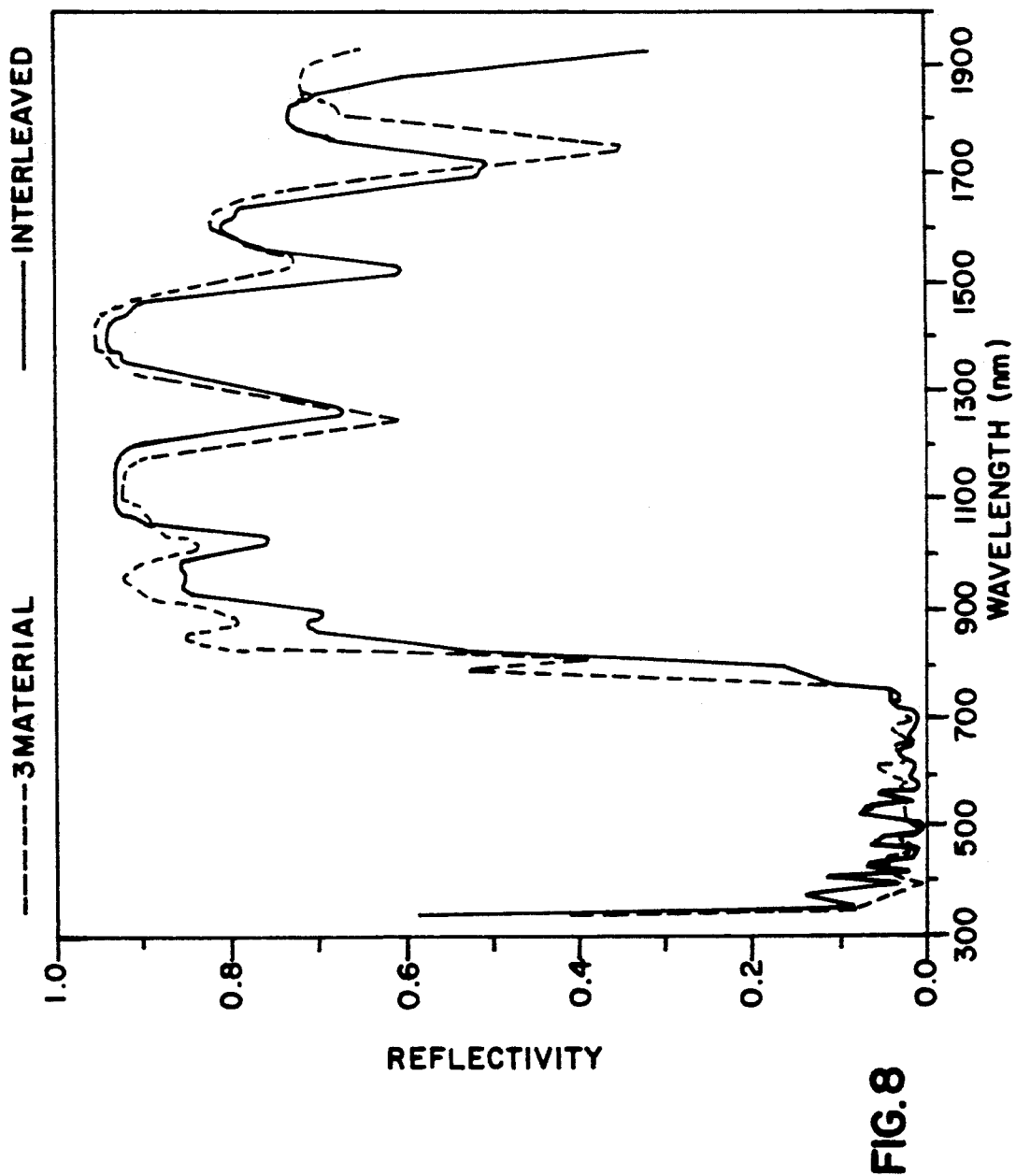
FIG. 8 shows a comparison of the reflectance of an IR reflector designed around interleaved stacks of the present invention with an IR reflector designed around a three material stack.

FIG. 8 shows a comparison of the reflectance of the interleaved stacks of the present invention with prior art stacks (3 material) published in European Patent Application 90307792.3. FIG. 8 shows that the interleaved stacks perform comparably to the 3 material stacks.

While there has been shown and described what is at present the preferred embodiments of the invention, various alternations and modifications will be obvious to those skilled in the art. All such modifications are intended to fall within the scope of the appended claims.

What is claimed is:

1. An optical interference coating for reflecting infrared radiation and transmitting visible light comprising:
   one or more interleaved stacks said interleaved stacks comprising a first stack containing three alternating layers of high and low refractive index materials of form (L/a bH L/a), and a second stack containing three alternating layers of high and low refractive index materials of the form (H/a bL H/a)
   wherein a and b are predetermined values, and $a \geq 1.75$;
   and wherein L and H are a low and a high index of refraction material respectively, L and H each being defined as having an optical thickness of a multiple of a quarter-wave of the stack wavelength.

2. The coating of claim 1 further comprising a stack of the form (L/a bH L/a) added to one side of the one or more interleaved stacks to achieve symmetry.

3. The coating of claim 2 further comprising
   one or more stacks of the form (L/2 H L/2) added to the one or more interleaved stacks to define the transmission bandwidth for an IR reflector.

4. The coating of claim 1 further comprising
   one or more stacks of the form (L/2 H L/2) added to the one or more interleaved stacks to define the transmission bandwidth for an IR reflector.

5. The coating of claim 1 wherein the low refractive index material has a value of between approximately 1.40–1.50 and the high index of refraction material has a value of between approximately 2.0–2.2.

6. The coating of claim 1 wherein the values of a and b are defined as
   $1.75 \leq a \leq 2.5$ and
   $2.75 \leq b \leq 3.25$.

* * * * *